United States Patent
Wang et al.

(10) Patent No.: US 12,479,764 B2
(45) Date of Patent: Nov. 25, 2025

(54) DISPERSION-BASED READY-TO-USE (RTU) TECHNOLOGY WITH PERFORMANCE OF A REACTIVE RESIN

(71) Applicant: Laticrete International, Inc., Bethany, CT (US)

(72) Inventors: Suxin Wang, Bethany, CT (US); Rajeswari Kompalli, Bethany, CT (US); Randall Bright, Naugatuck, CT (US); Eerik Maandi, Rocky Hill, CT (US); Kerstin D. Salinas, Seymour, CT (US); Amanda McKnight, Bethany, CT (US)

(73) Assignee: Laticrete International, Inc, Bethany, CT (US)

( * ) Notice: Subject to any disclaimer, the term of this patent is extended or adjusted under 35 U.S.C. 154(b) by 0 days.

(21) Appl. No.: 18/623,807

(22) Filed: Apr. 1, 2024

(65) Prior Publication Data
US 2024/0246859 A1    Jul. 25, 2024

Related U.S. Application Data

(63) Continuation of application No. 17/254,610, filed as application No. PCT/US2019/039864 on Jun. 28, 2019, now Pat. No. 11,958,775.

(Continued)

(51) Int. Cl.
C04B 26/06        (2006.01)
C04B 14/06        (2006.01)
(Continued)

(52) U.S. Cl.
CPC ............. *C04B 26/06* (2013.01); *C04B 14/06* (2013.01); *C04B 14/28* (2013.01); *C04B 14/303* (2013.01);
(Continued)

(58) Field of Classification Search
CPC .......... C04B 26/06; C04B 14/06; C04B 14/28; C04B 14/303; C04B 14/42; C04B 18/146;
(Continued)

(56) References Cited

U.S. PATENT DOCUMENTS 6,063,861 A    5/2000   Irle et al.
8,357,238 B2   1/2013   Taylor et al.
(Continued)

FOREIGN PATENT DOCUMENTS

| CN | 103923271 B | * | 4/2016 |
| WO | 200177242 A2 | | 10/2001 |
| WO | 2009155115 A2 | | 12/2009 |

OTHER PUBLICATIONS

Datasheet of Rhoximat DS 931 (Year: 2012).*
English translation of CN 103923271B (Year: 2016).*

*Primary Examiner* — Catherine S Branch
*Assistant Examiner* — Andrea Wu
(74) *Attorney, Agent, or Firm* — DeLio Peterson & Curcio LLC; Kelly M. Nowak

(57) ABSTRACT

Dispersion-based ready-to-use grout formulations, methods of making such dispersion-based ready-to-use grout formulations, and the resultant grout products that perform as reactive resin grout products. The grout formulations of the invention at least include a water-based acrylic polymer dispersion binder and optionally a water-based acrylate copolymer dispersion binder, in combination with one or more of an alkaline cross-linker, one or more silane adhesion promoters and/or a micro-fiber filler, along with various other constituents, to provide one-part ready-to-use grout formulations that require no mixing prior to use thereof. The resultant grout products of the invention meet performance standards of epoxy grout products, without requiring mixing of composition parts and without any adverse side effects.

19 Claims, 1 Drawing Sheet

|  | ANSI 118.3 Requirement | Commercial 3-part Epoxy Grout | Invention | Competitive/ Comparative RTU-1 | Competitive/ Comparative RTU-2 | Competitive/ Comparative RTU-3 |
|---|---|---|---|---|---|---|
| 7d Compressive Strength, psi | 3500 | 3600 | 3200-3800 | 61 | 317 | 134 |
| 7d Tensile Strength, psi | 1000 | 1000 | 1300 | 66 | 127 | 337 |
| 14 D Thermal Shock, psi | 500 | 500-550 | 500-600 |  | 85 | Fails |
| 14 D Shear Strength, psi | 1000 | 1150 | 1100 | Did not Test | < 100 | < 150 |

Related U.S. Application Data

(60) Provisional application No. 62/692,006, filed on Jun. 29, 2018.

(51) Int. Cl.

| | |
|---|---|
| *C04B 14/28* | (2006.01) |
| *C04B 14/30* | (2006.01) |
| *C04B 14/42* | (2006.01) |
| *C04B 18/14* | (2006.01) |
| *C04B 24/02* | (2006.01) |
| *C04B 24/12* | (2006.01) |
| *C04B 24/16* | (2006.01) |
| *C04B 24/38* | (2006.01) |
| *C04B 24/42* | (2006.01) |
| *C04B 103/00* | (2006.01) |
| *C04B 103/50* | (2006.01) |
| *C04B 103/60* | (2006.01) |
| *C04B 103/67* | (2006.01) |
| *C04B 111/70* | (2006.01) |

(52) U.S. Cl.
CPC ............ *C04B 14/42* (2013.01); *C04B 18/146* (2013.01); *C04B 24/023* (2013.01); *C04B 24/128* (2013.01); *C04B 24/16* (2013.01); *C04B 24/383* (2013.01); *C04B 24/42* (2013.01); *C04B 2103/0062* (2013.01); *C04B 2103/0079* (2013.01); *C04B 2103/50* (2013.01); *C04B 2103/601* (2013.01); *C04B 2103/67* (2013.01); *C04B 2111/70* (2013.01)

(58) Field of Classification Search
CPC ..... C04B 24/023; C04B 24/128; C04B 24/16; C04B 24/383; C04B 24/42; C04B 2103/0062; C04B 2103/0079; C04B 2103/50; C04B 2103/601; C04B 2103/67; C04B 2111/70
See application file for complete search history.

(56) References Cited

U.S. PATENT DOCUMENTS

| | | | |
|---|---|---|---|
| 2005/0124735 A1* | 6/2005 | Schad | ..................... C04B 26/30 524/547 |
| 2005/0124754 A1 | 6/2005 | Schad et al. | |
| 2005/0197437 A1 | 9/2005 | Kyte et al. | |
| 2005/0250668 A1 | 11/2005 | Serobian et al. | |
| 2011/0183558 A1 | 7/2011 | Ildefy | |
| 2012/0082791 A1 | 4/2012 | Liversage | |
| 2014/0357756 A1 | 12/2014 | Kompalli et al. | |
| 2015/0336844 A1 | 11/2015 | Kompalli et al. | |
| 2016/0229749 A1 | 8/2016 | Mania et al. | |

* cited by examiner

|  | ANSI 118.3 Requirement | Commercial 3-part Epoxy Grout | Invention | Competitive/ Comparative RTU-1 | Competitive/ Comparative RTU-2 | Competitive/ Comparative RTU-3 |
|---|---|---|---|---|---|---|
| 7d Compressive Strength, psi | 3500 | 3600 | 3200-3800 | 61 | 317 | 134 |
| 7d Tensile Strength, psi | 1000 | 1000 | 1300 | 66 | 127 | 337 |
| 14 D Thermal Shock, psi | 500 | 500-550 | 500-600 |  | 85 | Fails |
| 14 D Shear Strength, psi | 1000 | 1150 | 1100 | Did not Test | < 100 | < 150 |

DISPERSION-BASED READY-TO-USE (RTU) TECHNOLOGY WITH PERFORMANCE OF A REACTIVE RESIN

PRIORITY

This application is a continuation of Ser. No. 17/254,610 filed Jun. 28, 2019, which is a 371 filing of international patent application no. PCT/US2019/039864 filed Jan. 28, 2019, which claims priority to U.S. Provisional Application No. 62/692,006 filed Jun. 29, 2018.

TECHNICAL FIELD

The present invention is directed to a dispersion-based ready-to-use grout that improves existing ready-to-use grouts and meets performance requirements of an epoxy grout.

DESCRIPTION OF RELATED ART

Various types of grouts exist in today's market for a wide variety of applications. A common usage of grouts is in the construction industry, and in particular, for use in joining tile, masonry and other types of building materials, as well as for filling joints and voids between such materials.

Grouts exist in different forms including, for instance, cement-based grouts and/or polymer modified cement-based grouts, two-part polymer grouts (e.g., epoxy grouts), and one-part polymer grouts (i.e., ready-to-use). Each of these types of grouts has its advantages and disadvantages. The performance of each of these grouts is determined by several International Standards (ISO/EN Standards) & Domestic Standards (ANSI).

Epoxy grouts or epoxy resin grouts have far superior performance as compared to cement or ready-to-use grouts. Epoxy-based grouts (e.g., epoxy resin grouts) are examples of two-part polymer grout systems, as well as three-part grout compositions or systems, that all require mixing prior to use thereof. These mixing steps can be labor intensive, time consuming, and generate problems in the laid grout (e.g., by inadequate or improper mixing). While such epoxy-based grouts are often hard and resistant to chemicals and stains, drawbacks thereof include the multiple parts of such systems, their mixing requirements and the problems associated therewith. Additionally, epoxy-based grouts may have health concerns as they are sometimes associated with sensitization and allergic responses, and are often more expensive as compared to the alternative grout materials.

As an alternative to epoxy-based grouts, currently available grouts also include premixed and/or one-part grout compositions. Since they come ready-to-use in a pre-mixed state, these types of grouts are often easier to use than cementitious epoxy-based grouts and/or two-part or three-part grout systems. One of the biggest advantages of such premixed grouts is that they do not need to be mixed with other constituent(s) prior to use thereof, which aids in their ease of use.

Currently available premixed grouts are also relatively safe and do not generate dust. Ready-to-use grout products are the most preferred technology for modern consumers in the construction markets. However, several limitations exist with the currently available ready-to-use grout products including, for instance, their insufficient or lack of durability as compared to the durability of epoxy-based grouts (e.g., the durability of epoxy resin grouts). Currently available ready-to-use grouts also do not have sufficient water resistance as compared to that of the epoxy-based grouts and cement-based grouts, thereby limiting their use and applications.

In view of the foregoing, there continues to be a need for new and improved ready-to-use grouts having superior chemical and physical properties (e.g., durability, water resistance, etc.) as compared to currently available ready-to-use epoxy-based grouts, for which the present invention provides a solution thereto.

SUMMARY OF THE INVENTION

Bearing in mind the problems and deficiencies of the prior art, it is therefore an object of the present invention to provide premixed, ready-to-use dispersion-based compositions.

Another object of the present invention is to provide premixed, ready-to-use dispersion-based compositions formulated for use as grouts and adhesives that require no additional water.

It is another object of the present invention to provide premixed ready-to-use dispersion-based grouts and adhesives that are easy to use in installation procedures.

A further object of the invention is to provide ready to use premixed ready-to-use dispersion-based grouts and adhesives that require minimal preparation prior to use thereof.

It is yet another object of the present invention to provide ready to use premixed ready-to-use dispersion-based grouts and adhesives having reduced hazardous health risks.

Another object of the present invention is to provide premixed ready-to-use dispersion-based grouts and adhesives that are cost efficient and provide strong, durable dried products.

Still other objects and advantages of the invention will in part be obvious and will in part be apparent from the specification.

The above and other objects, which will be apparent to those skilled in the art, are achieved in the present invention which is directed to grout in a ready-to-use grout formulation. The grout formulation includes a first water-based dispersion binder material, optionally a second water-based dispersion binder material, a preservative, and one or more freeze thaw stabilizers. The grout formulation also includes a defoamer, one or more rheological modifiers, and one or more filler materials. The grout formulation is formulated as a one-part formulation requiring no mixing prior to use.

In one or more embodiments the first water-based dispersion binder material may be a water-based acrylic polymer dispersion binder material, and the second water-based dispersion binder material may be a water-based acrylate copolymer dispersion binder material. The water-based acrylic polymer dispersion binder material may be a styrene acrylic polymer material, and the water-based acrylate copolymer dispersion binder material may be a styrene-acrylate copolymer dispersion material. In certain embodiments the styrene acrylic polymer material may be present in an amount ranging from 15 wt. % to 22 wt. %, while the styrene-acrylate copolymer dispersion material may be present in an amount up to 5 wt. %, wherein the amounts are based on a total weight of the grout formulation. The one or more filler materials may be one or more sand materials present in the grout formulation in a total amount ranging from 70 wt. % to 90 wt. %, wherein the total amount is based on the total weight of the grout formulation.

The grout formulations of the invention may further include one or more cross-linkers, one or more adhesion promoters, and an anti-microbial material. The preservative may be an in-can stabilizer.

In other embodiments, the invention is directed to ready-to-use grout formulations that include a water-based acrylic polymer dispersion binder material, optionally a water-based acrylate copolymer dispersion binder material, a preservative, an anti-microbial material, one or more freeze thaw stabilizers, a defoamer, one or more adhesion promoters, one or more rheological modifiers, and one or more filler materials. These ready-to-use grout formulations are each one-part formulations that require no mixing prior to use thereof. The water-based acrylic polymer dispersion binder material may be a styrene acrylic polymer material, and the water-based acrylate copolymer dispersion binder material may be a styrene-acrylate copolymer dispersion material.

In one or more embodiments the water-based acrylic polymer dispersion binder material may be present in an amount ranging from 15 wt. % to 22 wt. %. The water-based acrylate copolymer dispersion binder material may be present in an amount up to 5 wt. %. The preservative may be present in an amount ranging from 0.02 wt. % to 0.05 wt. %. The anti-microbial material may be present in an amount ranging from 0.01 wt. % to 0.025 wt. %. The one or more freeze thaw stabilizers may be present in an amount up to 0.8 wt. %. The defoamer may be present in an amount up to 0.5 wt. %. The one or more rheological modifiers may be present in an amount up to 2.0 wt. %. The one or more filler materials may be present in an amount ranging from 70 wt. % to 90 wt. %. The ready-to-use grout formulations may further include glass fiber as a reinforcement material, one or more alkaline cross-linkers, as well as one or more adhesion promoters present in an amount up to 5 wt. %, based on the total weight of the grout formulation. Each of the foregoing amounts are based on a total weight of the ready-to-use grout formulation.

In embodiments of the invention the water-based acrylic polymer dispersion binder material may have a solids content ranging from 45% to 60% solids, a specific gravity ranging from about 0.95 g/cm$^3$ to 1.10 g/cm$^3$, and a pH ranging from about 6-9. The water-based acrylate copolymer dispersion binder material may be a styrene-acrylate copolymer dispersion having a solids content ranging from 45% to 60% solids.

In the invention, the preservative may be a blend of hexahydro-1,3,5-tris (2-hydroxyethyl)-s-triazine and 1,2-benzisothiazolin-3-one, or it may be a material having 20% METHYL-3(2H)-ISOTHIAZOLONE as an active ingredient. The anti-microbial material may be 2-n-butyl-benzo[d] isothiazol-3-one or a material having Diiodomethyl-ptolylsulfone as an active ingredient. The one or more freeze thaw stabilizers may be a hydrophobic glycol ether, a hydrophilic glycol ether, or even combinations thereof. The one or more freeze thaw stabilizers may be a slow-evaporating, hydrophobic glycol ether solvent. The one or more freeze thaw stabilizers may be a dipropylene glycol n-butyl ether. The one or more freeze thaw stabilizers may be a surfactant of polyethylene glycol tert-octylphenyl ether. The defoamer may be a siloxane-based defoamer. The rheological modifiers may be hydroxyethylcellulose, a micro-fiber filler, hydrophobic fumed silica, aluminum oxide, or calcium carbonate. The one or more filler materials may be one or more sand materials having a particle size ranging from 60-1000 micrometers. These sand materials may be uncolored silica-based sand, colored silica-based sand, or both uncolored and colored silica-based sand. The one or more adhesion promoters may be polyurethane dispersions, acrylic-urethane hybrid dispersions, epoxy functional silane or silane dispersions.

In accordance with one or more embodiments, the ingredients within the grout formulations of the invention may be present in the following amounts: the water-based acrylic polymer dispersion binder material may be present in an amount ranging from 17.0 wt. % to 21.5 wt. %, the water-based acrylate copolymer dispersion binder material may be present in an amount above 0 wt. % to 1.10 wt. %, the preservative may be present in an amount ranging from 0.01 wt. % to 0.035 wt. %, the anti-microbial material may be present in an amount ranging from 0.01 wt. % to 0.025 wt. %, the one or more freeze thaw stabilizers may be present in an amount ranging from 0.100 wt. % to 0.40 wt. %, the defoamer may be present in an amount ranging from 0.088 wt. % to 0.2 wt. %, the one or more rheological modifiers may be present in an amount ranging from 0.440 wt. % to 2.0 wt. %, and the one or more filler materials may be present in an amount ranging from 74 wt. % to 85 wt. %. These amounts are all based on the total weight of the grout formulation. The grout formulations may further include one or more alkaline cross-linkers present in a total amount ranging from 0.60 wt. % to 2.10 wt. %, and one or more silane-based adhesion promoters present in total amount ranging from 0.30 wt. % to 1.1 wt. %.

In other aspects, the invention is also directed to grout products formulated by the ready-to-use grout formulations discussed herein above and below, as well as methods of formulating the ready-to-use grout formulations discussed herein above and below.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a table showing comparative test results of the formulations of the invention as compared to commercial 3-part epoxy grout and various known commercially available RTU grouts. As evidenced, the formulations of the invention perform more like the tested 3-part epoxy grout than the tested commercially available RTU grouts do.

MODE(S) FOR CARRYING OUT INVENTION

In describing the preferred embodiment of the present invention, reference will be made herein to FIG. 1 of the drawings in which like numerals refer to like features of the invention.

The embodiments of the present invention can comprise, consist of, and consist essentially of the features and/or steps described herein, as well as any of the additional or optional ingredients, components, steps, or limitations described herein or would otherwise be appreciated by one of skills in the art. It is to be understood that all concentrations disclosed herein are by weight percent (wt. %.) based on a total weight of the composition unless otherwise indicated.

The present invention refers to a unique, dispersion-based ready-to-use grout that meets performance requirements of an epoxy grout. The term "ready-to-use" ("RTU") refers to a grout formulation that is a one-part formulation that requires no mixing prior to use thereof, which may be referred to herein as a "RTU" grout.

In accordance with the various embodiments, the present invention is directed to ready-to-use grouts and grout products, and their methods and use thereof, that have properties and perform like that of an epoxy grout performance, i.e. compressive strength ≥3500 psi, 14-day shear bonding strength ≥1000 psi and 14 day thermal shock bonding strength ≥500 psi, and all of these properties are tested based ANSI 118.3. In referring to the grouts/adhesives of the invention being premixed and ready-to-use, it should be understood that no additional water needs to be added to the compositions of the invention prior to use thereof. The grouts and grout products of the invention are suited for use with tile and in tiling applications. The present various ready-to-use grouts/grout products provide superior chemical resistance; stain resistance and higher performance to submerged water applications. The testing for physical performance has been confirmed and validated by ANSI 118.3.

In accordance with invention, the instant premixed ready-to-use dispersion-based grouts and adhesives include one or more water-based dispersion binder materials. In one or more embodiments, the ready-to-use formulations of the invention for use as grouts and adhesives includes a combination of dispersion binder materials. For instance, certain formulations may include two or more dispersion binder materials in combination with one another. Dispersion-based binder materials suitable for use in accordance with the invention include, but are not limited to, one or more synthetic latex binder materials. In one or more preferred embodiments, the premixed ready-to-use dispersion-based formulations of the invention include at least a first dispersion binder material and a second dispersion binder material. These first and second dispersion binders may be water-based emulsion polymers or copolymers materials.

A first water-based dispersion binder material may include an acrylic polymer dispersion. Suitable acrylic polymer dispersions for use in the invention include a styrene acrylic (SA) polymer material, such as, those having a higher amount of soft monomer (e.g., butyl acrylate) as compared to known styrene butadiene (SB) polymers. In one or more embodiments, suitable acrylic polymer dispersions for use in the invention have properties including, but not limited to, a solids content ranging from about 45% to 60% solids with the remainder being water, a specific gravity ranging from about 0.95 g/cm$^3$ to 1.10 g/cm$^3$, a pH ranging from about 6-9, a viscosity <1000 cps, and a glass transition temperature (Tg) ranging from about −40° C. to 100° C.

In one or more preferred embodiments, the first water-based emulsion dispersion binder material may comprise a modified styrene acrylic latex. The modified styrene acrylic latex may be in the RTU grout formulations of the invention in an amount ranging from about 15 wt. % to about 22 wt. % (based on a total weight of the RTU formulation). A preferred modified styrene acrylic latex may have properties including a solids content of about 45.5% with the remainder being water, a density measured at 20° C. of about 1.04 g/cm$^3$, a pH of about 8.2, a viscosity <600 cps, and a Tg of about 39° C. The acrylic polymer dispersions provide the instant RTU formulations with improved adhesive strength, toughness, flexibility, water impermeability, stability (e.g., compounding stability, in-can stability, etc.), chemical resistance (e.g., chemical, acid, organic solvents, water, stain, abrasion and oil resistance), durability, control of setting speed, and the like.

The second water-based dispersion binder material may include an acrylate copolymer dispersion. Suitable acrylate copolymer dispersions include, but are not limited to, copolymers of styrene and acrylic, such as, a styrene-acrylate copolymer dispersion. The styrene-acrylate copolymer dispersions may be present in the RTU grout formulations of the invention in an amount ranging from about 0 wt. % to about 5 wt. % (based on a total weight of the RTU formulation), and have a solids content ranging from about 45% to 60% solids with the remainder being water. A preferred copolymer dispersion is a modified styrene-acrylate latex having properties including a solids content of about 45.0% with the remainder being water, a density measured at 20° C. of about 1.04 g/cm$^3$, a pH of about 6.0, a viscosity <200 cps, and a Tg of about 97° C. The modified styrene-acrylate latex provides the instant RTU formulations with improved adhesive strength, hardness, compressive strength, shear bonding strength, and chemical resistance.

The premixed ready-to-use dispersion-based formulations of the invention for use as grouts and adhesives also includes one or more freeze thaw stabilizers and/or co-solvents. These freeze thaw stabilizers and/or co-solvents may include, but are not limited to, a hydrophobic glycol ether, a hydrophilic glycol ether, or the like, and combinations thereof. The hydrophobic glycol ether may include slow-evaporating, hydrophobic glycol ether solvent that is suitable in water-borne latex systems. In one or more embodiments a suitable hydrophobic glycol ether solvent is a dipropylene glycol n-butyl ether having the chemical formula $C_4H_9O[CH_2CH(CH_3)O]_2H$. A suitable hydrophilic glycol ether may include a surfactant of polyethylene glycol tert-octylphenyl ether. Both the hydrophobic glycol ether and the hydrophilic glycol ether may each be present in the instant RTU grout formulations in amounts ranging from about 0 wt. % to about 0.4 wt. % (based on a total weight of the RTU formulation).

The RTU grout and adhesive formulations of the invention also include a preservative (i.e., an in-can preservative, in-can stabilizer, etc.) and a dry surface anti-microbial material. The preservative may comprise a blend of hexahydro-1,3,5-tris (2-hydroxyethyl)-s-triazine and 1,2-benzisothiazolin-3-one, or alternatively a material having 20% METHYL-3(2H)-ISOTHIAZOLONE as the active ingredient. The preservative may be present in the RTU grout formulations in amounts ranging from about 0.02 wt. % to about 0.05 wt. % (based on a total weight of the RTU formulation). The anti-microbial material may comprise 2-n-butyl-benzo[d]isothiazol-3-one, or alternatively a material having Diiodomethyl-ptolylsulfone as the active ingredient. The anti-microbial material may be present in amounts ranging from about 0.01 wt. % to about 0.025 wt. %.

The various RTU grout and adhesive formulations also include one or more rheological modifiers present in amounts ranging from about 0 wt. % to about 2.0 wt. % (based on a total weight of the RTU formulation). The rheological modifiers may include hydroxyethylcellulose (preferably, from about 0 wt. % to about 0.25 wt. %), a micro-fiber filler, hydrophobic fumed silica, aluminum oxide, calcium carbonate, and the like. For instance, a cellulose fiber comprising 81.75%+/−4.5% (cellulose) and 18.25%+/−4.5% (kaolin clay) may be provided in the instant RTU grout formulations. In addition to the rheological modifiers, the present formulations may also include a reinforcement materials, such as glass fiber, in an amount ranging from about 0 wt. % to about 1 wt. % (based on a total weight of the RTU formulation).

Adhesion promoters may also be included within the present RTU grout and adhesive formulations. One or more adhesion promoter may be included within the various formulations of the invention, each in amounts ranging from about 0 wt. % to about 5 wt. % (based on a total weight of the RTU formulation). Suitable adhesion promoters for use in the invention include, but are not limited to, polyurethane dispersions, acrylic-urethane hybrid dispersions, epoxy functional silane, and the like. For instance, in one or more preferred embodiments epoxy functional silane adhesion promoters may include an epoxy functional silane, such as, gamma-glycidoxypropyltrimethoxysilane, an epoxysilane oligomer containing gamma-glycidoxy and trimethoxy functions, 3-Glycidoxypropylmethyldiethoxysilane, and the like.

The premixed ready-to-use dispersion-based formulations of the invention may also include one or more hydrophobe materials, a cross-linker, defoamer, as well as one or more filler materials. The hydrophobe materials may each be present in amounts ranging from about 0 wt. % to about 5 wt. % (based on a total weight of the RTU formulation), and may include a silicone dispersion, a wax dispersion, and the like. The cross-linker may be an alkaline cross-linker present in an amount ranging from about 0 wt. % to about 2 wt. % (based on a total weight of the RTU formulation). Suitable cross-linkers for use in the invention may include, for instance, an alkaline cross-linker comprising 59-61% Zinc Oxide, 37.5-39.5% water, 0-2% sodium polynaphthalenesulfonate, 0-2% dispersant/suspension additive(s), and the like. The defoamer may be present in amounts ranging from about 0 wt. % to about 0.5 wt. % (based on a total weight of the RTU formulation), and may include a siloxane-based defoamer, such as, an organo-modified silicone-based defoamer. The remainder of the RTU formulations of the invention include one or more filler materials. In one or more preferred embodiments, the filler materials comprise one or more sand or colored silica sand fillers. For instance, the filler may be uncolored and/or colored silica-based sand, such as, silica fume sand having a particle size of about 60-1000 micrometer. These one or more filler materials may be present in the RTU formulation in amounts ranging from about 70 wt. % to about 90 wt. % (based on a total weight of the RTU formulation).

The various materials that may be provided within the premixed RTU dispersion-based grout and adhesive formulations, and thereby the resultant grouts/adhesives, of the invention are detailed below in Table 1. It should be appreciated that various combinations of the materials described herein may be used in combination with each other to formulate the dispersion-based RTU grouts/adhesives of the invention. It should also be appreciated that these formulations render the grout/adhesive material of the invention as well as the resultant grout/adhesive layer after deposition and curing.

Referring to Table 1 below, and the examples of the invention that follow, the premixed RTU dispersion-based formulations of the invention at least include a first dispersion binder, a second dispersion binder, a preservative, anti-microbial material, one or more freeze thaw stabilizers/co-solvent(s), a defoamer, one or more rheological modifiers, and one or more filler materials. Certain embodiments of the invention further include cross-linker(s) and adhesion promoter(s). Preferably the first and second dispersion binders comprise first and second water-based dispersion binder materials.

The various ready-to-use grout formulations of the present invention are described in Table 1 below:

TABLE 1

| Grout Formulations | | Range |
|---|---|---|
| Composition | Property/Characteristics | (wt %)* |
| Acrylic Polymer Dispersion | First Dispersion Binder | 15-22% |
| Styrene-Acrylate Copolymer Dispersion | Second Dispersion Binder | 0-5% |
| Hydrophobic Glycol Ether | Freeze Thaw Stabilizers/Co-Solvent | 0-0.4% |
| Hydrophilic Glycol Ether | Freeze Thaw Stabilizers/Co-Solvent | 0-0.4% |
| Blend of Hexahydro-1,3,5-tris (2-hydroxyethyl)-s-triazine and 1,2-benzisothiazolin-3-one | In-Can Preservative | 0.02-0.05% |
| 2-n-butyl-benzo[d]isothiazol-3-one | Dry Surface Anti-Microbial | 0.01-0.025% |
| Hydroxyethylcellulose | First Rheological Modifier | 0-0.25% |
| Micro-Fiber Filler | Second Rheological Modifier | 0-1% |
| Hydrophobic Fumed Silica | Third Rheological Modifier | 0-1% |
| Glass Fiber | Reinforcement | 0-1% |
| Polyurethane Dispersion | First Adhesion Promoter | 0-5% |
| Acrylic-urethane hybrid Dispersion | Second Adhesion Promoter | 0-5% |
| Silane Dispersion | Third Adhesion Promoter | 0-5% |
| Silicone Dispersion | First Hydrophobe | 0-5% |
| Wax Dispersion | Second Hydrophobe | 0-5% |
| Alkaline Cross-Linker | Cross-Linker | 0-2.2% |
| Siloxane-Based Defoamer | Defoamer | 0-0.5% |
| One or More Sand or Colored Silica Sand | Filler(s) | 70-90% |
| TOTAL FORMULATION | | 100% |

*Range weight % based on total weight of grout formulation

It has been found that the ready-to-use dispersion-based formulations of the invention, for use as grouts and adhesives, and thereby the resultant grout and/or adhesive products, advantageously meet performance requirements of a reactive resin (i.e., an epoxy grout) as measured in accordance with ANSI 118.3 standards. It is further beneficial that the formulations of the invention perform as a reactive resin while being a ready-to-use composition that does not require mixing as they are premixed water-based formulations. The instant RTU grout/adhesive formulations are also low in VOCs, do not have any potential health risks to the user/applicator, and potentially no skin sensitization. The various RTU grout/adhesive formulations of the invention may be used in both interior and exterior applications, as well as be exposed to water and be installed for submerged applications. It has further been found that the RTU grout/adhesive formulations provide resultant grout/adhesive products that have superior stain resistance and chemical resistance, as compared to currently available RTU grouts.

While not meant to be limiting, for ease of understanding the invention, various exemplary RTU dispersion-based grout/adhesive formulations of the invention are described in connection with Table 2A to Table 2B. Exemplary formulations are detailed in Tables "A", while comparative test results are detailed in Tables "B".

TABLE 2A

In accordance with the invention, a first exemplary RTU grout formulation that meets performance requirements of an epoxy grout is as follows:
Example 1 (Sample RTUG-67A)

| Composition | Property/Characteristics | Wt. %* |
|---|---|---|
| Acrylic Polymer Dispersion | First Dispersion Binder | 21.31% |
| Styrene-Acrylate Copolymer Dispersion | Second Dispersion Binder | 1.00% |
| Blend of Hexahydro-1,3,5-tris (2-hydroxyethyl)-s-triazine and 1,2-benzisothiazolin-3-one | In-can Stabilizer | 0.03% |
| Diiodomethyl-ptolylsulfone as an active ingredient | Anti-microbial | 0.02% |
| Hydrophobic Glycol Ether | Freeze Thaw Stabilizers/Co-Solvent | 0.20% |
| Siloxane-Based Defoamer | Defoamer | 0.10% |
| Alkaline Cross-Linker | Cross-Linker | 0.70% |
| Micro-Fiber Filler | Rheological Modifier | 1.00% |
| First Sand/Colored Silica Sand | Filler | 35.64% |
| Second Sand/Colored Silica Sand | Filler | 40.00% |
| TOTAL FORMULATION | | 100.00% |

*Range weight % based on total weight of Example 1 grout formulation.

TABLE 2B

Comparative test results of Example 1 as compared to a commercially available RTU grout. The measured test results evidence that the inventive formulation of Example 1 performs more like a commercially available epoxy grout as compared to the tested commercially available RTU grout.

| Physical Performance Attributes | Comparative Epoxy Grout - Meets ANSI 118.3 | Example 1 | Comparative RTU Grout |
|---|---|---|---|
| 7 day compressive strength, psi | 2903 | 2953 | 317 |
| 24 Hour A shore Hardness | 90 | 90 | 53 |
| 48 Hour A shore Hardness | 94 | 90 | 72 |
| 24 Hour D Shore Hardness | 52 | 46 | 8 |
| 48 Hour D shore Hardness | 51 | 48 | 21 |

TABLE 3A

In accordance with the invention, a second exemplary RTU grout formulation that meets performance requirements of an epoxy grout is as follows:
Example 2 (Sample RTUG-67A6)

| Composition | Property/Characteristics | Wt. %* |
|---|---|---|
| Modified Styrene Acrylic Latex | First Dispersion Binder | 20.892% |
| Modified Styrene Acrylate Latex | Second Dispersion Binder | 0.980% |
| Blend of Hexahydro-1,3,5-tris (2-hydroxyethyl)-s-triazine and 1,2-benzisothiazolin-3-one | In-can Stabilizer | 0.029% |
| Diiodomethyl-ptolylsulfone as an active ingredient | Anti-microbial | 0.020% |
| Hydrophobic Glycol Ether | Freeze Thaw Stabilizers/Co-Solvent | 0.196% |
| Siloxane-Based Defoamer | Defoamer | 0.098% |
| Alkaline Cross-Linker | Cross-Linker | 0.686% |
| Silane Dispersion | Adhesion Promoter | 1.961% |
| First Sand/Colored Silica Sand | Filler | 74.157% |
| Micro-Fiber Filler | Rheological Modifier | 0.980% |
| TOTAL FORMULATION | | 100.00% |

*Range weight % based on total weight of Example 2 grout formulation.

TABLE 3B

In the comparative tests as described below in relation to the Examples 2-11 of the invention, the 7-day and 14-day compressive strengths were measured as per ANSI 118.3. The 14-day bonding strength to Quarry tile and 14-day thermal shock were measured as per ANSI 118.3. Since the formulations of the invention are 1-part RTU formulations that are cured by water evaporation, the sample dimensions were changed from 6" × 3" × ½" to 3" × 1.5" × ¼" because ANSI 118.3 is a test standard for 2-part epoxy system.
In the below table, the comparative test results of Example 2 as compared to a commercially available RTU grout. The measured test results evidence that the inventive formulation of Example 2 performs more like a commercially available epoxy grout as compared to the tested commercially available RTU grout.

| Physical Performance Attributes | Example 2 | Comparative RTU Grout |
|---|---|---|
| 24 hour Hardness | D50 | A56 |
| Density, g/cm3 | 1.90 | 1.87 |
| 7-day Compressive strength (psi); ANSI 118.3 requires 3500 psi to pass | 3227 | 317 |
| 14-day Compressive strength (psi) | 3193 | 307 |
| 14-day Bonding strength to Quarry tile (psi); ANSI 118.3 requires 1000 psi to pass | 1409 | 126 |
| 14-day Thermal shock test (psi); ANSI 118.3 requires 500 psi to pass | 580 | 85 |
| 3-day shower test | pass | pass |
| Water cleanability | good | good |

TABLE 4A

In accordance with the invention, a third exemplary RTU grout formulation that meets performance requirements of an epoxy grout is as follows:
Example 3 (Sample RTUG2-6A4)

| Composition | Property/Characteristics | Wt. %* |
|---|---|---|
| Modified Styrene Acrylic Latex | First Dispersion Binder | 17.430% |
| Modified Styrene Acrylate Latex | Second Dispersion Binder | 0.890% |
| Blend of Hexahydro-1,3,5-tris (2-hydroxyethyl)-s-triazine and 1,2-benzisothiazolin-3-one | In-can Stabilizer | 0.030% |
| Diiodomethyl-ptolylsulfone as an active ingredient | Anti-microbial | 0.020% |
| Hydrophobic Glycol Ether | Freeze Thaw Stabilizers/Co-Solvent | 0.200% |
| Siloxane-Based Defoamer | Defoamer | 0.100% |
| Alkaline Cross-Linker | Cross-Linker | 0.700% |
| Silane Dispersion | Adhesion Promoter | 0.880% |
| Uncolored & Colored Silica based Filler | Filler | 79.150% |
| Cellulose Micro-Fiber Filler | First Rheological Modifier | 0.600% |
| TOTAL FORMULATION | | 100.00% |

*Range weight % based on total weight of Example 3 grout formulation.

TABLE 4B

Comparative test results of Example 3 as compared to a commercially available RTU grout. The measured test results evidence that the inventive formulation of Example 3 performs more like a commercially available epoxy grout as compared to the tested commercially available RTU grout.

| Physical Performance Attributes | Example 3 | Comparative RTU Grout |
|---|---|---|
| 24 hour Hardness | D52 | A56 |
| Density, g/cm3 | 1.83 | 1.87 |
| 7-day Compressive strength (psi); ANSI 118.3 requires 3500 psi to pass | 3548 | 317 |
| 14-day Compressive strength (psi) | 3632 | 307 |
| 14-day Bonding strength to Quarry tile (psi); ANSI 118.3 requires 1000 psi to pass | 1098 | 126 |
| 14-day Thermal shock test (psi); ANSI 118.3 requires 500 psi to pass | 910 | 85 |
| 3-day shower test | pass | pass |
| Water cleanability | good | good |

TABLE 5A

In accordance with the invention, a fourth exemplary RTU grout formulation that meets performance requirements of an epoxy grout is as follows:
Example 4 (Sample RTUG2-23A)

| Composition | Property/Characteristics | Wt. %* |
|---|---|---|
| Modified Styrene Acrylic Latex | First Dispersion Binder | 18.841% |
| Modified Styrene Acrylate Latex | Second Dispersion Binder | 0.883% |
| Blend of Hexahydro-1,3,5-tris (2-hydroxyethyl)-s-triazine and 1,2-benzisothiazolin-3-one | In-can Stabilizer | 0.026% |
| Diiodomethyl-ptolylsulfone as an active ingredient | Anti-microbial | 0.018% |
| Hydrophobic Glycol Ether | Freeze Thaw Stabilizers/Co-Solvent | 0.177% |
| Siloxane-Based Defoamer | Defoamer | 0.088% |
| Alkaline Cross-Linker | Cross-Linker | 0.795% |
| Silane Dispersion of epoxysilane oligomer containing Gamma-Glycidoxy and trimethoxy functions | Adhesion Promoter | 0.500% |
| Uncolored & Colored Silica based Filler | Filler | 78.054% |
| Cellulose Micro-Fiber Filler | First Rheological Modifier | 0.618% |
| TOTAL FORMULATION | | 100.00% |

*Range weight % based on total weight of Example 4 grout formulation.

TABLE 5B

Comparative test results of Example 4 as compared to a commercially available RTU grout. The measured test results evidence that the inventive formulation of Example 4 performs more like a commercially available epoxy grout as compared to the tested commercially available RTU grout.

| Physical Performance Attributes | Example 4 | Comparative RTU Grout |
|---|---|---|
| 24 hour Hardness | D47 | A56 |
| Density, g/cm3 | 1.76 | 1.87 |
| 7-day Compressive strength (psi); ANSI 118.3 requires 3500 psi to pass | 3727 | 317 |
| 14-day Compressive strength (psi) | 3920 | 307 |
| 14-day Bonding strength to Quarry tile (psi); ANSI 118.3 requires 1000 psi to pass | 1056 | 126 |
| 14-day Thermal shock test (psi); ANSI 118.3 requires 500 psi to pass | 734 | 85 |
| 3-day shower test | pass | pass |
| Water cleanability | good | good |

TABLE 6A

In accordance with the invention, a fifth exemplary RTU grout formulation that meets performance requirements of an epoxy grout is as follows:
Example 5 (Sample RTUG2-96)

| Composition | Property/Characteristics | Wt. %* |
|---|---|---|
| Modified Styrene Acrylic Latex | First Dispersion Binder | 18.830% |
| Modified Styrene Acrylate Latex | Second Dispersion Binder | 1.028% |

TABLE 6A-continued

In accordance with the invention, a fifth exemplary RTU grout formulation that meets performance requirements of an epoxy grout is as follows:
Example 5 (Sample RTUG2-96)

| Composition | Property/Characteristics | Wt. %* |
|---|---|---|
| 20% active ingredient of METHYL-3(2H)-ISOTHIAZOLONE | In-can Stabilizer | 0.031% |
| Hydrophilic Glycol Ether - Surfactant, Polyethylene glycol tert-octylphenyl ether | Freeze Thaw Stabilizers/Co-Solvent | 0.206% |
| Diiodomethyl-ptolylsulfone as an active ingredient | Anti-microbial | 0.021% |
| Hydrophobic Glycol Ether | Freeze Thaw Stabilizers/Co-Solvent | 0.206% |
| Siloxane-Based Defoamer | Defoamer | 0.103% |
| Alkaline Cross-Linker | Cross-Linker | 1.543% |
| Silane Dispersion of epoxysilane oligomer containing Gamma-Glycidoxy and trimethoxy functions | Adhesion Promoter | 0.514% |
| Uncolored & Colored Silica based Filler | Filler | 76.051% |
| Aluminum Oxide | Rheological Modifier | 0.440% |
| Cellulose Micro-Fiber Filler | Rheological Modifier | 1.028% |
| TOTAL FORMULATION | | 100.00% |

*Range weight % based on total weight of Example 5 grout formulation.

TABLE 6B

Comparative test results of Example 5 as compared to a commercially available RTU grout. The measured test results evidence that the inventive formulation of Example 5 performs more like a commercially available epoxy grout as compared to the tested commercially available RTU grout.

| Physical Performance Attributes | Example 5 | Comparative RTU Grout |
|---|---|---|
| 24 hour Hardness | D54 | A56 |
| Density, g/cm3 | 1.79 | 1.87 |
| 7-day Compressive strength (psi); ANSI 118.3 requires 3500 psi to pass | 3297 | 317 |
| 14-day Compressive strength (psi) | 3894 | 307 |
| 14-day Bonding strength to Quarry tile (psi); ANSI 118.3 requires 1000 psi to pass | 837 | 126 |
| 14-day Thermal shock test (psi); ANSI 118.3 requires 500 psi to pass | 857 | 85 |
| 3-day shower test | pass | pass |
| Water cleanability | good | good |

TABLE 7A

In accordance with the invention, a sixth exemplary RTU grout formulation that meets performance requirements of an epoxy grout is as follows:
Example 6 (Sample RTUG3-41A)

| Composition | Property/Characteristics | Wt. %* |
|---|---|---|
| Modified Styrene Acrylic Latex | First Dispersion Binder | 18.900% |
| Modified Styrene Acrylate Latex | Second Dispersion Binder | 1.000% |
| Hydrophilic Glycol Ether - Surfactant, Polyethylene glycol tert-octylphenyl ether | Freeze Thaw Stabilizers/Co-Solvent | 0.200% |
| 20% active ingredient of METHYL-3(2H)-ISOTHIAZOLONE | In-can Stabilizer | 0.030% |
| Alkaline Cross-Linker | Cross-Linker | 1.000% |
| Diiodomethyl-ptolylsulfone as an active ingredient | Anti-microbial | 0.020% |
| Hydrophobic Glycol Ether | Freeze Thaw Stabilizers/Co-Solvent | 0.200% |
| Siloxane-Based Defoamer | Defoamer | 0.100% |
| Silane Dispersion of epoxysilane oligomer containing Gamma-Glycidoxy and trimethoxy functions | Adhesion Promoter | 0.500% |
| Uncolored & Colored Silica based Filler | Filler | 77.050% |
| Cellulose Micro-Fiber Filler | Rheological Modifier | 1.000% |
| TOTAL FORMULATION | | 100.00% |

*Range weight % based on total weight of Example 6 grout formulation.

TABLE 7B

Comparative test results of Example 6 as compared to a commercially available RTU grout. The measured test results evidence that the inventive formulation of Example 6 performs more like a commercially available epoxy grout as compared to the tested commercially available RTU grout.

| Physical Performance Attributes | Example 6 | Comparative RTU Grout |
|---|---|---|
| 24 hour Hardness | NA | A56 |
| Density, g/cm3 | 1.83 | 1.87 |
| 7-day Compressive strength (psi); ANSI 118.3 requires 3500 psi to pass | 3422 | 317 |
| 14-day Compressive strength (psi) | 3824 | 307 |
| 14-day Bonding strength to Quarry tile (psi); ANSI 118.3 requires 1000 psi to pass | 774 | 126 |
| 14-day Thermal shock test (psi); ANSI 118.3 requires 500 psi to pass | 620 | 85 |
| 3-day shower test | pass | pass |
| Water cleanability | good | good |

TABLE 8A

In accordance with the invention, a seventh exemplary RTU grout formulation that meets performance requirements of an epoxy grout is as follows:
Example 7 (Sample RTUG3-20A)

| Composition | Property/Characteristics | Wt. %* |
|---|---|---|
| Modified Styrene Acrylic Latex | First Dispersion Binder | 17.710% |
| Modified Styrene Acrylate Latex | Second Dispersion Binder | 1.000% |

TABLE 8A-continued

In accordance with the invention, a seventh exemplary RTU grout formulation that meets performance requirements of an epoxy grout is as follows:
Example 7 (Sample RTUG3-20A)

| Composition | Property/Characteristics | Wt. %* |
|---|---|---|
| Hydrophilic Glycol Ether - Surfactant, Polyethylene glycol tert-octylphenyl ether | Freeze Thaw Stabilizers/Co-Solvent | 0.200% |
| 20% active ingredient of METHYL-3(2H)-ISOTHIAZOLONE | In-can Stabilizer | 0.030% |
| Alkaline Cross-Linker | Cross-Linker | 2.100% |
| Diiodomethyl-ptolylsulfone as an active ingredient | Anti-microbial | 0.020% |
| Hydrophobic Glycol Ether | Freeze Thaw Stabilizers/Co-Solvent | 0.200% |
| Siloxane-Based Defoamer | Defoamer | 0.100% |
| Silane Dispersion of epoxysilane oligomer containing Gamma-Glycidoxy and trimethoxy functions | Adhesion Promoter | 0.500% |
| Uncolored & Colored Silica based Filler | Filler | 77.140% |
| Cellulose Micro-Fiber Filler | Rheological Modifier | 1.000% |
| TOTAL FORMULATION | | 100.00% |

*Range weight % based on total weight of Example 7 grout formulation.

TABLE 8B

Comparative test results of Example 7 as compared to a commercially available RTU grout. The measured test results evidence that the inventive formulation of Example 7 performs more like a commercially available epoxy grout as compared to the tested commercially available RTU grout.

| Physical Performance Attributes | Example 7 | Comparative RTU Grout |
|---|---|---|
| 24 hour Hardness | NA | A56 |
| Density, g/cm3 | 1.81 | 1.87 |
| 7-day Compressive strength (psi); ANSI 118.3 requires 3500 psi to pass | 3503 | 317 |
| 14-day Compressive strength (psi) | 3909 | 307 |
| 14-day Bonding strength to Quarry tile (psi); ANSI 118.3 requires 1000 psi to pass | 894 | 126 |
| 14-day Thermal shock test (psi); ANSI 118.3 requires 500 psi to pass | 739 | 85 |
| 3-day shower test | pass | pass |
| Water cleanability | good | good |

TABLE 9A

In accordance with the invention, an eigth exemplary RTU grout formulation that meets performance requirements of an epoxy grout is as follows:
Example 8 (Sample RTUG2-80A)

| Composition | Property/Characteristics | Wt. %* |
|---|---|---|
| Modified Styrene Acrylic Latex | First Dispersion Binder | 19.961% |
| Modified Styrene Acrylate Latex | Second Dispersion Binder | 1.028% |
| 20% active ingredient of METHYL-3(2H)-ISOTHIAZOLONE | In-can Stabilizer | 0.031% |

TABLE 9A-continued

In accordance with the invention, an eigth exemplary RTU grout formulation that meets performance requirements of an epoxy grout is as follows:
Example 8 (Sample RTUG2-80A)

| Composition | Property/Characteristics | Wt. %* |
|---|---|---|
| Hydrophilic Glycol Ether -Surfactant, Polyethylene glycol tert-octylphenyl ether | Freeze Thaw Stabilizers/Co-Solvent | 0.103% |
| Diiodomethyl-ptolylsulfone as an active ingredient | Anti-microbial | 0.021% |
| Hydrophobic Glycol Ether | Freeze Thaw Stabilizers/Co-Solvent | 0.206% |
| Siloxane-Based Defoamer | Defoamer | 0.103% |
| An epoxy functional silane, Gamma-Glycidoxypropyltrimethoxysilane | Adhesion promoter | 0.514% |
| 3-Glycidoxypropylmethyldiethoxysilane | Adhesion promoter | 0.514% |
| Uncolored & Colored Silica based Filler | Filler | 76.051% |
| Aluminum Oxide | Rheological Modifier | 0.440% |
| Cellulose Micro-Fiber Filler | Rheological Modifier | 1.028% |
| TOTAL FORMULATION | | 100.00% |

*Range weight % based on total weight of Example 8 grout formulation.

TABLE 9B

Comparative test results of Example 8 as compared to a commercially available RTU grout. The measured test results evidence that the inventive formulation of Example 8 performs more like a commercially available epoxy grout as compared to the tested commercially available RTU grout.

| Physical Performance Attributes | Example 8 | Comparative RTU Grout |
|---|---|---|
| 24 hour Hardness | NA | A56 |
| Density, g/cm3 | 1.8 | 1.87 |
| 7-day Compressive strength (psi); ANSI 118.3 requires 3500 psi to pass | 3447 | 317 |
| 14-day Compressive strength (psi) | 3625 | 307 |
| 14-day Bonding strength to Quarry tile (psi); ANSI 118.3 requires 1000 psi to pass | substrate failure | 126 |
| 14-day Thermal shock test (psi); ANSI 118.3 requires 500 psi to pass | 572 | 85 |
| 3-day shower test | pass | pass |
| Water cleanability | good | good |

TABLE 10A

In accordance with the invention, a ninth exemplary RTU grout formulation that meets performance requirements of an epoxy grout is as follows:
Example 9 (Sample RTUG2-91C)

| Composition | Property/Characteristics | Wt. %* |
|---|---|---|
| Modified Styrene Acrylic Latex | First Dispersion Binder | 19.895% |
| Modified Styrene Acrylate Latex | Second Dispersion Binder | 1.030% |
| 20% active ingredient of METHYL-3(2H)-ISOTHIAZOLONE | In-can Stabilizer | 0.031% |

TABLE 10A-continued

In accordance with the invention, a ninth exemplary RTU grout formulation that meets performance requirements of an epoxy grout is as follows:
Example 9 (Sample RTUG2-91C)

| Composition | Property/Characteristics | Wt. %* |
|---|---|---|
| Hydrophilic Glycol Ether -Surfactant, Polyethylene glycol tert-octylphenyl ether | Freeze Thaw Stabilizers/Co-Solvent | 0.206% |
| Diiodomethyl-ptolylsulfone as an active ingredient | Anti-microbial | 0.021% |
| Hydrophobic Glycol Ether | Freeze Thaw Stabilizers/Co-Solvent | 0.206% |
| Siloxane-Based Defoamer | Defoamer | 0.103% |
| An epoxy functional silane, Gamma-Glycidoxypropyltrimethoxysilane | Adhesion promoter | 0.515% |
| 3-Glycidoxypropylmethyldiethoxysilane | Adhesion promoter | 0.309% |
| Uncolored & Colored Silica based Filler | Filler | 76.213% |
| Calcium Carbonate | Rheological Modifier | 0.441% |
| Cellulose Micro-Fiber Filler | Rheological Modifier | 1.030% |
| TOTAL FORMULATION | | 100.00% |

*Range weight % based on total weight of Example 9 grout formulation.

TABLE 10B

Comparative test results of Example 9 as compared to a commercially available RTU grout. The measured test results evidence that the inventive formulation of Example 9 performs more like a commercially available epoxy grout as compared to the tested commercially available RTU grout.

| Physical Performance Attributes | Example 9 | Comparative RTU Grout |
|---|---|---|
| 24 hour Hardness | NA | A56 |
| Density, g/cm3 | 1.8 | 1.87 |
| 7-day Compressive strength (psi); ANSI 118.3 requires 3500 psi to pass | 3179 | 317 |
| 14-day Compressive strength (psi) | 3580 | 307 |
| 14-day Bonding strength to Quarry tile (psi); ANSI 118.3 requires 1000 psi to pass | 847 | 126 |
| 14-day Thermal shock test (psi); ANSI 118.3 requires 500 psi to pass | 470 | 85 |
| 3-day shower test | pass | pass |
| Water cleanability | good | good |

TABLE 11A

In accordance with the invention, a tenth exemplary RTU grout formulation that meets performance requirements of an epoxy grout is as follows:
Example 10 (Sample RTUG2-6A3)

| Composition | Property/Characteristics | Wt. %* |
|---|---|---|
| Modified Styrene Acrylic Latex | First Dispersion Binder | 18.185% |
| Modified Styrene Acrylate Latex | Second Dispersion Binder | 0.893% |
| Blend of Hexahydro-1,3,5-tris(2-hydroxyethyl)-s-triazine and1,2-benzisothiazolin-3-one | In-can Stabilizer | 0.030% |
| Diiodomethyl-ptolylsulfone as an active ingredient | Anti-microbial | 0.020% |

TABLE 11A-continued

In accordance with the invention, a tenth exemplary RTU grout formulation that meets performance requirements of an epoxy grout is as follows:
Example 10 (Sample RTUG2-6A3)

| Composition | Property/Characteristics | Wt. %* |
|---|---|---|
| Hydrophobic Glycol Ether | Freeze Thaw Stabilizers/Co-Solvent | 0.201% |
| Siloxane-Based Defoamer | Defoamer | 0.100% |
| An epoxy functional silane, Gamma-Glycidoxypropyltrimethoxysilane | Adhesion promoter | 0.883% |
| Uncolored & Colored Silica based Filler | Filler | 79.388% |
| Cellulose Micro-Fiber Filler | Rheological Modifier | 0.301% |
| TOTAL FORMULATION | | 100.00% |

*Range weight % based on total weight of Example 10 grout formulation.

TABLE 11B

Comparative test results of Example 10 as compared to a commercially available RTU grout. The measured test results evidence that the inventive formulation of Example 10 performs more like a commercially available epoxy grout as compared to the tested commercially available RTU grout.

| Physical Performance Attributes | Example 10 | Comparative RTU Grout |
|---|---|---|
| 24 hour Hardness | NA | A56 |
| Density, g/cm3 | 1.85 | 1.87 |
| 7-day Compressive strength (psi); ANSI 118.3 requires 3500 psi to pass | 2820 | 317 |
| 14-day Compressive strength (psi) | 3112 | 307 |
| 14-day Bonding strength to Quarry tile (psi); ANSI 118.3 requires 1000 psi to pass | 680 | 126 |
| 14-day Thermal shock test (psi); ANSI 118.3 requires 500 psi to pass | 500 | 85 |
| 3-day shower test | pass | pass |
| Water cleanability | good | good |

TABLE 12A

In accordance with the invention, an eleventh exemplary RTU grout formulation that meets performance requirements of an epoxy grout is as follows:
Example 11 (Sample RTUG3-73J)

| Composition | Property/Characteristics | Wt. %* |
|---|---|---|
| Modified Styrene Acrylic Latex | First Dispersion Binder | 19.318% |
| Modified Styrene Acrylate Latex | Second Dispersion Binder | 1.027% |
| Hydrophilic Glycol Ether -Surfactant, Polyethylene glycol tert-octylphenyl ether | Freeze Thaw Stabilizers/Co-Solvent | 0.205% |
| 20% active ingredient of METHYL-3(2H)-ISOTHIAZOLONE | In-can Stabilizer | 0.031% |
| Alkaline Cross-Linker | Cross-Linker | 1.027% |
| Diiodomethyl-ptolylsulfone as an active ingredient | Anti-microbial | 0.021% |
| Hydrophobic Glycol Ether | Freeze Thaw Stabilizers/Co-Solvent | 0.205% |
| Siloxane-Based Defoamer | Defoamer | 0.103% |

TABLE 12A-continued

In accordance with the invention, an eleventh exemplary RTU grout formulation that meets performance requirements of an epoxy grout is as follows:
Example 11 (Sample RTUG3-73J)

| Composition | Property/ Characteristics | Wt. %* |
|---|---|---|
| An epoxy functional silane, Gamma-Glycidoxypropyltrimethoxysilane | Adhesion promoter | 0.308% |
| 3-Glycidoxypropylmethyldiethoxysilane | Adhesion promoter | 0.719% |
| Uncolored & Colored Silica based Filler | Filler | 75.572% |
| Aluminum Oxide | Rheological Modifier | 0.437% |
| Cellulose Micro-Fiber Filler | Rheological Modifier | 1.027% |
| TOTAL FORMULATION | | 100.00% |

*Range weight % based on total weight of Example 11 grout formulation.

TABLE 12B

Comparative test results of Example 11 as compared to a commercially available RTU grout. The measured test results evidence that the inventive formulation of Example 11 performs more like a commercially available epoxy grout as compared to the tested commercially available RTU grout.

| Physical Performance Attributes | Example 11 | Comparative RTU Grout |
|---|---|---|
| 24 hour Hardness | NA | A56 |
| Density, g/cm3 | 1.81 | 1.87 |
| 7-day Compressive strength (psi); ANSI 118.3 requires 3500 psi to pass | 2000 | 317 |
| 14-day Compressive strength (psi) | 2400 | 307 |
| 14-day Bonding strength to Quarry tile (psi); ANSI 118.3 requires 1000 psi to pass | 756 | 126 |
| 14-day Thermal shock test (psi); ANSI 118.3 requires 500 psi to pass | 408 | 85 |
| 3-day shower test | pass | pass |
| Water cleanability | good | good |

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A ready-to-use (RTU) grout formulation comprising:
    a water-based acrylic polymer comprising styrene acrylic polymer dispersion binder material;
    a water-based acrylate copolymer dispersion binder material; and
    one or more additives,
    wherein the RTU grout formulation is a one-part formulation requiring no mixing prior to use.

2. The RTU grout of claim 1 wherein the acrylic polymer comprising the water-based styrene acrylic polymer dispersion binder material is present in an amount up to 22 wt. %, based on a total weight of the RTU grout formulation.

3. The RTU grout of claim 1 wherein the styrene acrylic polymer dispersion binder material comprises a modified styrene acrylic latex.

4. The RTU grout of claim 3 wherein the modified styrene acrylic latex has a solids content of about 45.5% with the remainder being water.

5. The RTU grout of claim 3 wherein the modified styrene acrylic latex has a density of about 1.04 g/cm³ measured at 20° C.

6. The RTU grout of claim 3 wherein the modified styrene acrylic latex has a pH of about 8.2.

7. The RTU grout of claim 3 wherein the modified styrene acrylic latex has a viscosity <600 cps and a Tg of about 39° C.

8. The RTU grout of claim 1 wherein the water-based acrylate copolymer dispersion binder material comprises a styrene-acrylate copolymer dispersion.

9. The RTU grout of claim 8 wherein the styrene-acrylate latex has a solids content from about 45% to 60% with the remainder being water.

10. The RTU grout of claim 8 wherein the styrene-acrylate copolymer dispersion comprise a modified styrene-acrylate latex.

11. The RTU grout of claim 10 wherein the modified styrene-acrylate latex has a solids content of about 45.0% with the remainder being water.

12. The RTU grout of claim 10 wherein the modified styrene-acrylate latex has a density of about 1.04 g/cm³ measured at 20° C.

13. The RTU grout of claim 10 wherein the modified styrene-acrylate latex has a pH of about 6.0.

14. The RTU grout of claim 10 wherein the modified styrene-acrylate latex has a viscosity <200 cps and a Tg of about 97° C.

15. The RTU grout of claim 1 wherein the styrene acrylic polymer dispersion binder material is present in an amount up to 22 wt. %, and the water-based acrylate copolymer dispersion binder material is present in an amount up to 5 wt. %, both based on a total weight of the RTU grout formulation.

16. The RTU grout of claim 1 the one or more additives are selected from the group consisting of an in-can stabilizer, one or more freeze thaw stabilizers, a defoamer, one or more adhesion promoters, one or more rheological modifiers, one or more filler materials, one or more cross-linkers, an anti-microbial material, and mixtures thereof.

17. The RTU grout of claim 16 wherein the one or more additives is the one or more filler materials, said one or more filler materials comprising one or more sand materials present in the RTU grout formulation in a total amount ranging from 70 wt. % to 90 wt. %, wherein said total amount is based on the total weight of the RTU grout formulation.

18. The RTU grout of claim 1 wherein the one or more additives comprise:
    a preservative;
    one or more freeze thaw stabilizers;
    a defoamer;
    an adhesion promoter;
    one or more rheological modifiers, and
    one or more filler materials.

19. A grout product comprising:
    the grout product formulated from a ready-to-use (RTU) grout formulation comprising:
        a water-based acrylic polymer comprising styrene acrylic polymer dispersion binder material present in an amount up to 22 wt. %, based on a total weight of the RTU grout formulation;
        a water-based acrylate copolymer dispersion binder material present in an amount greater than 0 wt. % to 5 wt. %, based on said total weight of the ready-to-use grout formulation; and
one or more additives,
wherein the RTU grout formulation is a one-part formulation requiring no mixing prior to use.

* * * * *